United States Patent
Chen

(10) Patent No.: US 11,824,865 B2
(45) Date of Patent: Nov. 21, 2023

(54) METHOD FOR AUTHORIZING AUTHORIZATION OPERATOR IN SYSTEM

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 16/637,251

(22) PCT Filed: Aug. 6, 2018

(86) PCT No.: PCT/CN2018/099069
§ 371 (c)(1),
(2) Date: Feb. 6, 2020

(87) PCT Pub. No.: WO2019/029502
PCT Pub. Date: Feb. 14, 2019

(65) Prior Publication Data
US 2020/0204559 A1    Jun. 25, 2020

(30) Foreign Application Priority Data

Aug. 7, 2017 (CN) .......................... 201710668229.6

(51) Int. Cl.
*H04L 9/40* (2022.01)
*G06F 21/60* (2013.01)
*G06Q 10/105* (2023.01)

(52) U.S. Cl.
CPC .......... *H04L 63/102* (2013.01); *G06F 21/604* (2013.01); *G06Q 10/105* (2013.01); *H04L 63/104* (2013.01)

(58) Field of Classification Search
CPC ... H04L 63/102; H04L 63/104; G06F 21/604; G06Q 10/105
See application file for complete search history.

(56) References Cited

U.S. PATENT DOCUMENTS 6,202,066 B1 * 3/2001 Barkley .............. G06F 21/6218
707/785
7,113,923 B1    9/2006 Brichta et al.
(Continued)

FOREIGN PATENT DOCUMENTS

CN    101951377 A    1/2011
CN    102004868 A    4/2011
(Continued)

OTHER PUBLICATIONS

International Search Report in the international application No. PCT/CN2018/099069, dated Oct. 25, 2018.
(Continued)

*Primary Examiner* — Jason Chiang
(74) *Attorney, Agent, or Firm* — Ladas & Parry, LLP

(57) ABSTRACT

Disclosed in the present invention is a method for authorizing an authorization operator in a system, comprising: a system operator selects one or more authorization operators, configuring one or more grantees for each authorization operator; respectively configuring, by each authorization operator, a permission for each grantee requiring permission configuration among all the grantees corresponding to the authorization operator; and executing, by said grantee, a corresponding operation according to the configured permission. According to the present invention, a plurality of the authorization operators may be configured, and each grantee may be authorized by the corresponding authoriza-
(Continued)

tion operator having a clear understanding of the permission of the grantee, so that an error will not easily occur in an authorization operation.

6 Claims, 6 Drawing Sheets

(56) References Cited

U.S. PATENT DOCUMENTS

| | | | |
|---|---|---|---|
| 7,340,469 B1* | 3/2008 | Alghathbar | G06Q 10/06 |
| 7,827,615 B1* | 11/2010 | Allababidi | G06Q 10/10 |
| | | | 726/28 |
| 8,402,514 B1 | 3/2013 | Thompson et al. | |
| 2002/0156904 A1 | 10/2002 | Gullotta et al. | |
| 2006/0048224 A1* | 3/2006 | Duncan | G06F 21/6218 |
| | | | 726/22 |
| 2006/0218394 A1* | 9/2006 | Yang | G06F 21/604 |
| | | | 713/167 |
| 2007/0214497 A1* | 9/2007 | Montgomery | G06F 21/6218 |
| | | | 726/4 |
| 2008/0022370 A1* | 1/2008 | Beedubail | H04L 63/102 |
| | | | 726/4 |
| 2009/0089291 A1* | 4/2009 | Daily | G06F 21/6218 |
| | | | 707/999.009 |
| 2009/0328157 A1 | 12/2009 | Grabarnik et al. | |
| 2011/0246253 A1* | 10/2011 | Yu | G06F 16/256 |
| | | | 705/7.13 |
| 2012/0246098 A1* | 9/2012 | Chari | G06N 20/00 |
| | | | 706/12 |
| 2013/0104046 A1 | 4/2013 | Casco-Arias Sanchez et al. | |
| 2014/0129268 A1* | 5/2014 | B'Far | G06F 16/282 |
| | | | 705/7.11 |
| 2016/0026717 A1* | 1/2016 | Kelsey | H04L 63/105 |
| | | | 707/754 |
| 2017/0126681 A1* | 5/2017 | Barrett | H04L 63/08 |
| 2020/0389463 A1* | 12/2020 | Chen | H04L 63/105 |

FOREIGN PATENT DOCUMENTS

| | | |
|---|---|---|
| CN | 102046897 A | 5/2011 |
| CN | 103605916 A | 2/2014 |
| CN | 104050401 A | 9/2014 |
| CN | 104919414 A | 9/2015 |
| CN | 105184144 A | 12/2015 |
| CN | 106485388 A | 3/2017 |
| CN | 106570656 A | 4/2017 |
| CN | 107395611 A | 11/2017 |

OTHER PUBLICATIONS

Written Opinion of the International Searching Authority in the international application No. PCT/CN2018/099069, dated Oct. 25, 2018 with English translation provided by Google Translate.
First Office Action and Search Reports from CN app. No. 201810887157.9, dated Dec. 23, 2021, with English translation from Global Dossier, all pages.
Notice of Allowance from CN app. No. 201810887157.9, dated Feb. 23, 2021, with English translation from Google Translate, all pages.

* cited by examiner

METHOD FOR AUTHORIZING AUTHORIZATION OPERATOR IN SYSTEM

CROSS-REFERENCE TO RELATED APPLICATIONS

This application is the U.S. national phase of PCT/CN2018/099069 filed on Aug. 6, 2018, which claims priority to Chinese Application No. 201710668229.6 filed on Aug. 7, 2017, the disclosures of which are incorporated by reference herein in their entireties.

BACKGROUND

Technical Field

The present invention relates to an authorization method for ERP and other management software systems, in particular to a method for authorizing an authorization operator in a system.

Related Art

Role-based access control (RBAC) is one of the most researched and matured permission management mechanisms for database permissions in recent years. It is considered to be an ideal candidate to replace conventional mandatory access control (MAC) and discretionary access control (DAC). The basic idea of role-based access control (RBAC) is to divide different roles according to different functional positions in an enterprise organization view, encapsulate an access permission of database resources in roles, and allow users to indirectly access the database resources by being assigning different roles to the users.

A large number of tables and views are often built in large-scale application systems, which makes the management and permissions of database resources very complicated. It is very difficult for the user to directly manage the access and permissions of the database resources. It requires the user to have a very thorough understanding of the database structure and to be familiar with the use of the SQL language. Once the structures or security requirements of the application systems have changed, a large number of complex and cumbersome permission changes are required, and the security vulnerabilities caused by some unexpected authorization errors are very likely to occur. Therefore, designing a simple and efficient permission management method designed for large-scale application systems has become a common requirement for system and system users.

The role-based permission control mechanism can manage the access permissions of the system simply and efficiently, which greatly reduces the burden and cost of the system permission management, and makes the system permission management more compliant with the business management specifications of the application system.

However, the conventional role-based user permission management method adopts a "role-to-user one-to-many" relation mechanism, where the "role" is a group or class in nature, that is, one role can simultaneously correspond to/be related to multiple users, and the role is similar to a post/position/type of work and other concepts. The permissions authorized to a user under this relation mechanism are basically divided into the following three forms: 1, as shown in FIG. 1, the permissions are directly authorized to the user, where the disadvantage is that the workload is large, the operation is frequent and troublesome; 2. As shown in FIG. 2, the role (having the nature of a class/group/post/type of work) is authorized (a role can be related to multiple users), and the user obtains the permission through its role; 3. As shown in FIG. 3, the above two methods are combined.

In the above descriptions, as both 2 and 3 need to authorize the role having the nature of a class/group, and the way of authorization through the role in the nature of class/group/post/type of work has the following disadvantages: 1. when the user's permissions change, the operation is difficult: in the actual process of using a system, it is often necessary to adjust the user's permissions during the operation process. For example, when the employee's permission changes, the authority of an employee related to the role changes, we can't change the permissions of the entire role because of the change in the individual employee's permissions, because this role is also related to other employees whose permissions remain unchanged. So to cope with this situation, either create a new role to satisfy the employee whose permissions have changed, or directly authorize (disengaged from the role) from the employee based on the permission requirements. The above two processing methods not only require a long time for the role authorization in the case of a large number of role permissions, but also are easy to make mistakes, the user is cumbersome and troublesome to operate, and errors occur easily resulting in loss to the system user.

2. It is difficult to remember the specific permissions contained in a role for a long time: if the role has many permission function points, it will be difficult to remember the specific permissions of the role, and it is even more difficult to remember the differences in permissions of roles with similar permissions. If a new user needs to be associated, it is impracticable to accurately determine how to select a role for relation.

3. Because user permissions change, more roles will be created (if you do not create a new role, it will greatly increase the authorization directly to the user), and it is more difficult to distinguish the specific differences between permissions of the roles.

4. When a user is transferred from a post, if many permissions of the transferred user need to be assigned to other users, separating the permissions of the transferred users and creating roles to relate to other users respectively are necessary. Such operations are not only complicated and time-consuming, but also prone to errors.

For a large management software system, there are a lot of personnel to be authorized, permissions to be granted to grantees and functional modules that are contained. In the traditional authorization method, a system operator (admin/super administrator of the system) directly makes authorization; however, the system operator is a network administrator in most cases, who is not familiar with the permissions of each post and each employee. Generally, the system operator makes authorization through the dictation or writing form of relevant personnel, but may misunderstand, resulting in error in authorization.

In addition, the existing authorization operator is only the system operator, and for the large software system, a large amount of authorization requirements cause heavy authorization workload of the system operator, rendering the system operator to make errors in the work.

SUMMARY

Technical Problem

The present invention aims to overcome the defect of the prior art and provides a method for authorizing authorization operator in system. A plurality of authorization operators may be configured, and each grantee may be authorized with the corresponding permission by the corresponding authorization operator having a clear understanding of the permission of each grantee, so that an error will not easily occur in an authorization operation.

Technical Solution

The object of the present invention is achieved by the following technical solution: a method for authorizing authorization operator in system comprising: selecting (configuring) by a system operator (also expressed as "a permission operator having a permission of selecting/configuring an authorization operator"), one or more authorization operators; configuring one or more grantees for each authorization operator respectively (or configuring, by the system operator, one or more grantees for each authorization operator respectively); respectively configuring, by each authorization operator, a permission for each grantee requiring permission configuration among all the grantees corresponding to the authorization operator; and executing, by said grantee, a corresponding operation according to the configured permission.

Preferably, the authorization operator comprises a role, a user, an employee, a group, a class, a template, or one or more thereof. The said role is an independent individual not a group/class, and during the same period, one role can only be related to a unique user, while one user is related to one or more roles; and the user obtains permissions of the related role; and said grantee includes one or more types of a role, a user, an employee, a group and a class, said role is an independent individual not a group/class, and during the same period, one role can only be related to a unique user, while one user is related to one or more roles; and the user obtains permissions of the related role.

Preferably, when or after a role is created, a department is selected for the role, and therefore the role belongs to the department; the role is authorized according to the work content of the role, a name of the role is unique under the department, and a number of the role is unique in the system; and when said user is transferred from a post, the user's relation to the original role is canceled, and the user is related to a new role.

Preferably, the method for authorizing authorization operator in system further comprises: recording authorization operation information of the authorization operator.

Preferably, the grantee corresponding to each authorization operator does not include the authorization operator.

Preferably, the grantees are configured for the authorization operator, if a department is selected as the grantees, all roles/users/employees/groups/classes under the department are grantees corresponding to the authorization operator, and roles/users/employees/groups/classes added subsequently under the department are also grantees corresponding to the authorization operator.

The method for authorizing authorization operator in system comprises: a system operator (i.e., "a permission operator having a permission of selecting/configuring an authorization operator") selects one or more authorization operators; configuring one or more authorized permissions to be granted to grantees for each authorization operator respectively; granting, by each authorization operator to the corresponding grantee respectively, each authorized permission requiring grantee configuration among all the authorized permissions corresponding to the authorization operator; and executing, by said grantee, a corresponding operation according to the granted authorized permission.

Preferably, said authorization operator comprises a role, a user, an employee, a group, a class, a template, or one or more thereof, said role is an independent individual not a group/class, and during the same period, one role can only be related to a unique user, while one user is related to one or more roles; and the user obtains permissions of the related role.

Said grantee comprises a role, a user, an employee, a group, a class, a template, or one or more thereof, said role is an independent individual not a group/class, and during the same period, one role can only be related to a unique user, while one user is related to one or more roles; and the user obtains permissions of the related role.

Preferably, the grantee corresponding to each authorization operator does not include the authorization operator.

A method for authorizing authorization operator in system comprises:

(1) a system operator (also expressed as "a permission operator having a permission of selecting/configuring an authorization operator") selects one or more authorization operators;

(2) configuring one or more authorized permissions to be granted to grantees for each authorization operator respectively;

(3) configuring one or more grantees for each authorization operator respectively;

(4) respectively granting, by each authorization operator, one or more authorized permissions among all the authorized permissions corresponding to the authorization operator to each to-be-authorized grantee corresponding to the authorization operator; and (5) executing, by said grantee, a corresponding operation according to the granted authorized permission.

Steps (1) to (5) are performed sequentially, or performed in the following order: step (1), step (3), step (2), step (4) and step (5).

Preferably, the grantee corresponding to each authorization operator does not include the authorization operator.

Preferably, said authorization operator includes a role, a user, an employee, a group and a class, or one or more types thereof, said role is an independent individual not a group/class, and during the same period, one role can only be related to a unique user, while one user is related to one or more roles; and the user obtains permissions of the related role.

The grantee includes a role, a user, an employee, a group and a class, or one or more types thereof, said role is an independent individual not a group/class, and during the same period, one role can only be related to a unique user, while one user is related to one or more roles; and the user obtains permissions of the related role.

Advantages

The present invention has the advantages that (1) according to the present invention, a plurality of authorization operators may be configured, and each grantee may be authorized with the corresponding permission by the corresponding authorization operator having a clear understanding of the permission of each grantee, so that an error will not easily occur in an authorization operation.

For example, a deputy general manager in charge of sales is configured as the authorization operator, authorizing sales personnel in a company; a deputy general manager in charge of finance is configured as the authorization operator, authorizing financial personnel in a financial department; a general manager is configured as the authorization operator, authorizing each department manager; and "relevant grantees" are relevantly authorized by the authorization operator having an understanding of "relevant authorized permissions and the relevant grantees", making authorization more coincident with the actual management needs of enterprises.

(2) According to the present invention, a plurality of authorization operators may be configured, reducing the workload of each authorization operator and resulting in that an error will not easily occur in authorization.

(3) According to the present invention, authorization operation information of the system operator and/or the authorization operators is recorded, comprising one or more of the authorization operators, the grantees, the authorized permissions, authorization time and the like, which facilitates claiming the responsibility in case of errors and other situations.

(4) According to the present invention, the authorization operators cannot authorize themselves, thereby preventing the authorization operators from granting irrelevant (or unallowable) permissions to themselves and improving the information security of the company.

(5) The conventional permission management mechanism defines the role as the nature of a group, a type of work, a class or the like. The role is in a one-to-many relation to the user. In the actual process of using a system, the user's permissions often need to be adjusted during the operation process. For example, in processing the change of an employee's permissions, when the permissions of the employee related to the role have changed, it is improper to change the permissions of the entire role due to the change in the permissions of the individual employee, because this role is also related to other employees whose permissions remain unchanged. To cope with this situation, either a new role is created to fit the employee whose permissions have changed, or permissions are directly authorized to the employee (disengaged from the role) based on permission requirements. The above two processing methods not only take a long time but also cause mistakes easily during the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method of the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (the permissions of the user/role have changed dynamically), the solutions in the present application can significantly improve the permission management efficiency for the system user when using the system, make the dynamic authorization simpler, more convenient, clearer and more explicit, and improve the efficiency and reliability of the permission setting.

(6) The conventional role authorization method with the nature of a group is prone to errors. The method provided in the present application significantly reduces the probability of authorization errors, because the method of the present application only needs to consider the role as an independent individual, without considering the commonalities of multiple users related to the role having the nature of a group under the conventional method. Even if the authorization errors occur, only the user related to the role is affected. However, in the case of the conventional role having the nature of a group, all users related to the role will be affected. Even if the authorization errors occur, the correction method of the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(7) In the conventional group-based role authorization method, if the role has many permission function points, as time goes by, it is difficult to remember the specific permissions of the role, and it is even more difficult to remember the permission of roles with similar permissions. If a new user needs to be related, it cannot be accurately determined how to select a relation. In the method of the present application, the role itself has the nature of a post number/a work station number, such that the selection can be made easily.

(8) When a user is transferred from a post, if many permissions of the transferred user need to be assigned to other users, in processing, it is necessary to distinguish the permissions of the transferred user and then create roles to be related to other users respectively. The operations are complicated, time-consuming, and prone to errors.

The method of the present application is as follows: The transferred user is related to several roles. When the user is transferred, the relation of the user to the roles in the original department is first canceled (the canceled roles may be re-related to other users), and then the user is related to a role in a new department. The operation is simple and not error-prone.

(9) A department needs to be selected when or after a role is created. After the role belongs to the department, the department cannot be replaced. Reasons why the department to which the role belongs cannot be replaced are as follows: Reason 1: As the role in the present application is equivalent to a work station number/a post number in nature, different station numbers/post numbers have different work content/permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

DETAILED DESCRIPTION

The technical solution of the present invention will be further described in detail in conjunction with the drawings, but the scope of protection of the present invention is not limited to the following.

Figure 1:
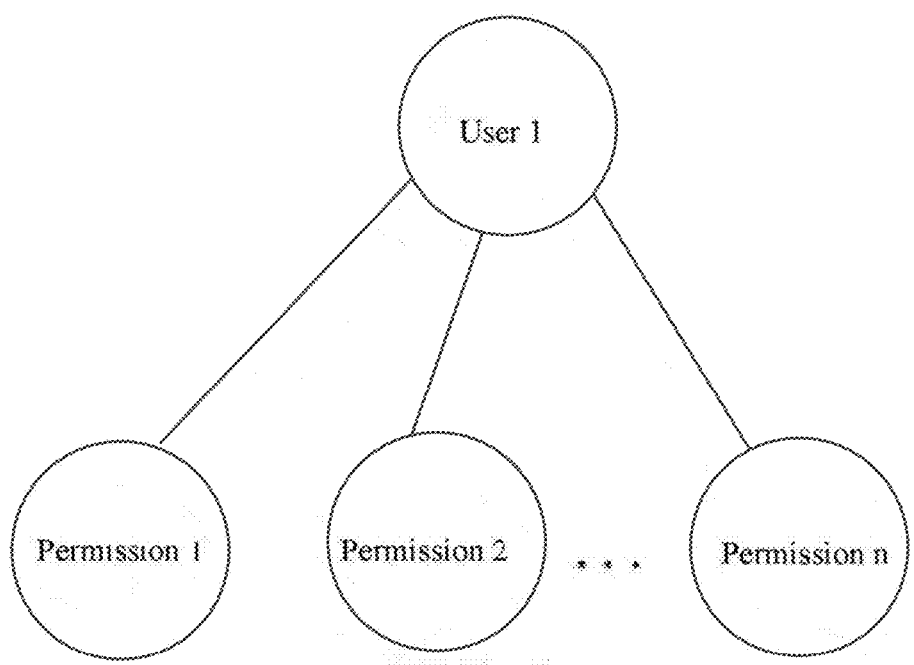
FIG. 1 is a schematic diagram of a way of direct authorization of a system to users in the Related Art.
Figure 2:
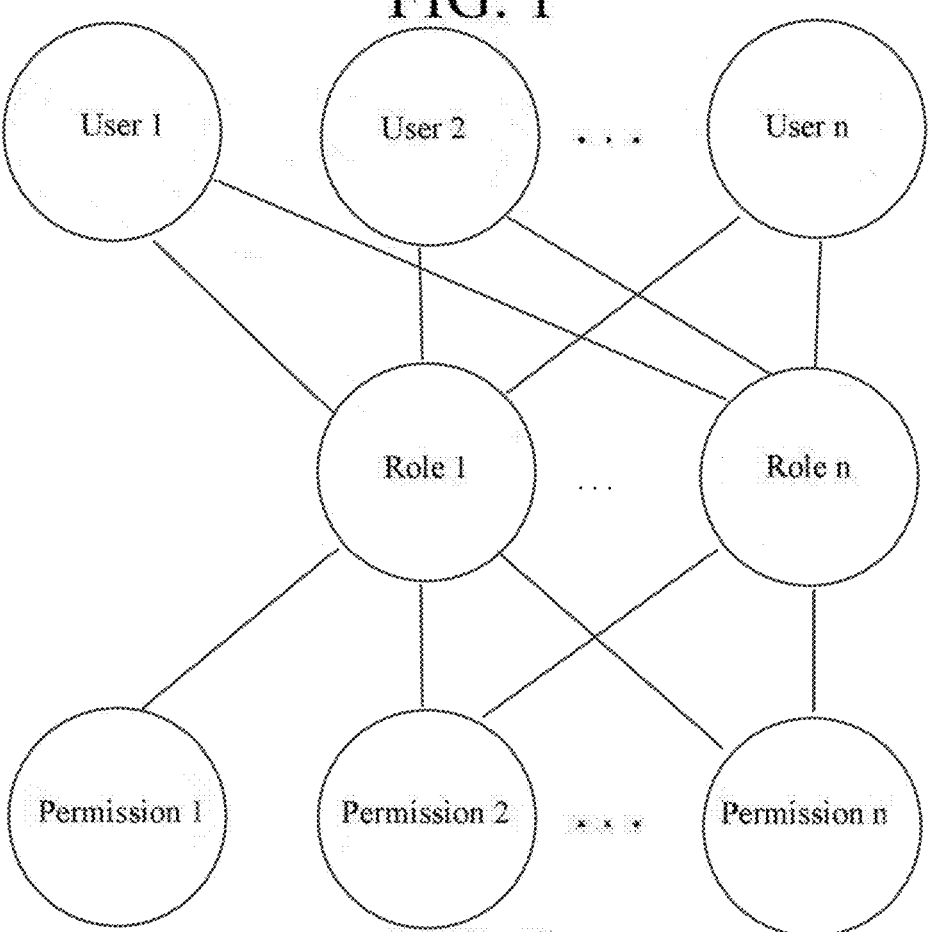
FIG. 2 is a schematic diagram of a way of authorization of a system to group/class-based roles in the Related Art.
Figure 3:
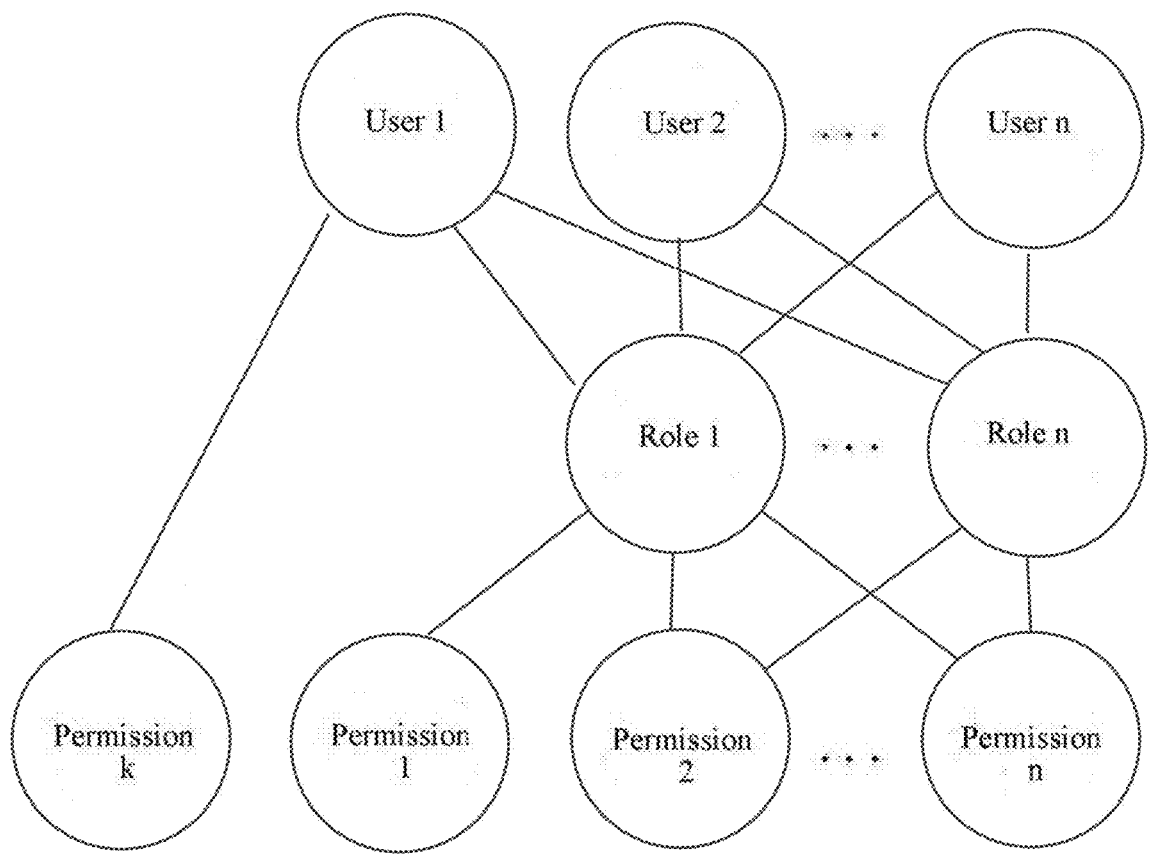
FIG. 3 is a schematic diagram of a way of combining direct authorization of a system to users and authorization of the system to group/class-based roles in the Related Art.
Figure 4:
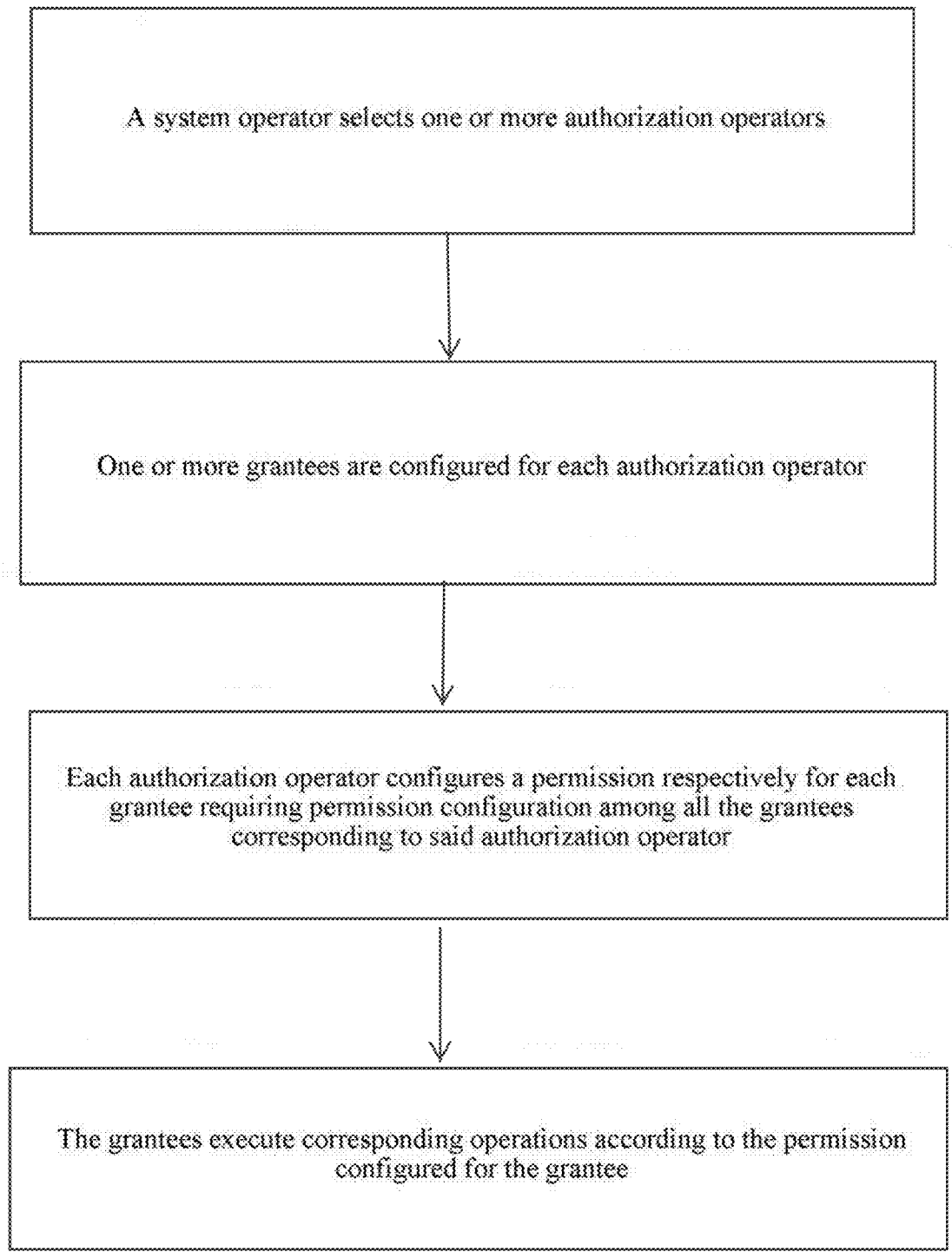
FIG. 4 is a flow schematic diagram of an implementation of the present invention.

[Embodiment I] As shown in FIG. 4, a method for authorizing authorization operator in system comprises that:

S11. a system operator selects one or more authorization operators.

The authorization operator includes a role, a user, an employee, a group and a class, or one or more types thereof.

Figure 5:
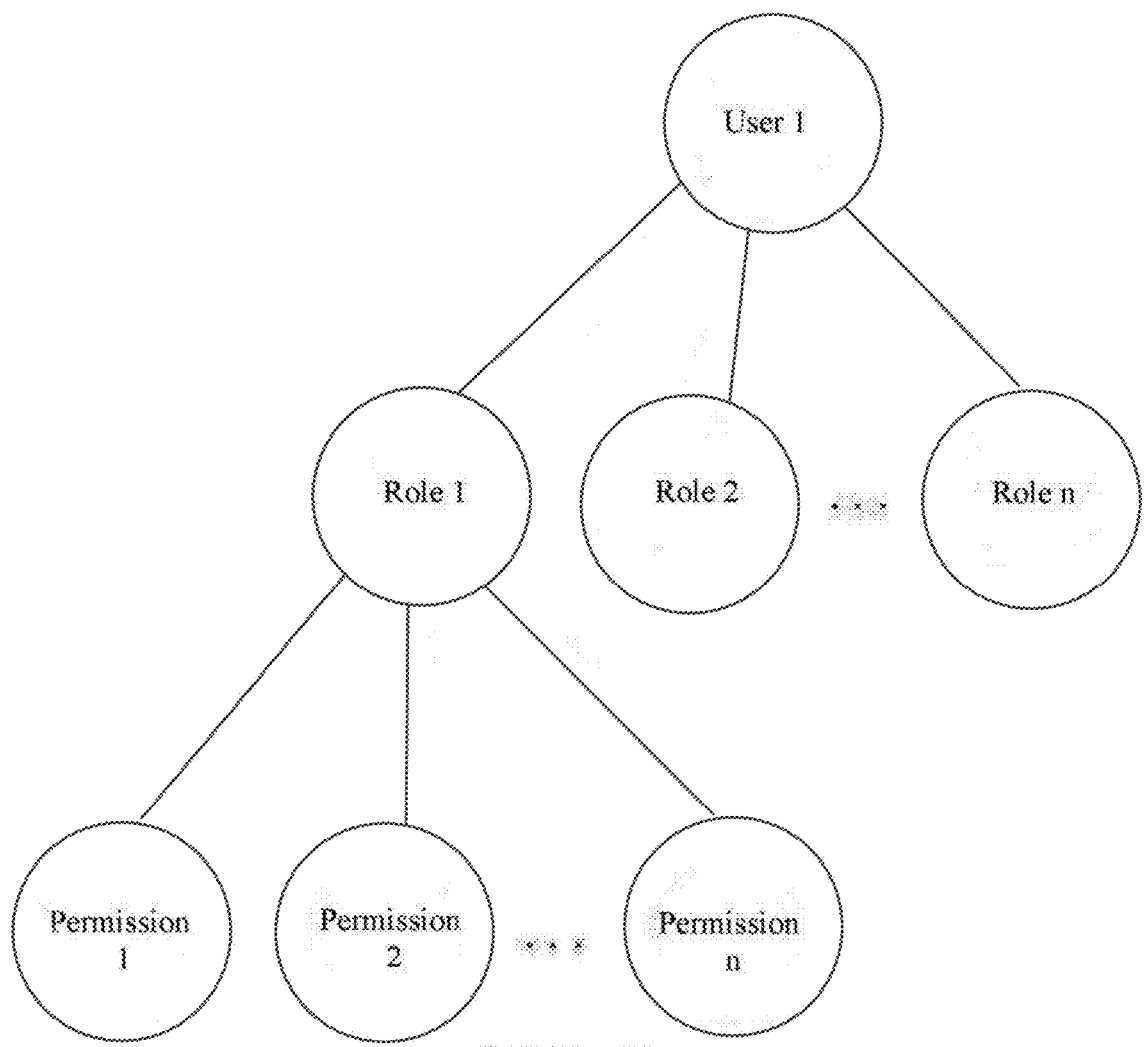
FIG. 5 is a schematic diagram of a way of authorization of a system to users through individual-based roles of the present invention.

As shown in FIG. 5, the role is an independent individual not a group/class, during the same period, one role can only be related to a unique user, while one user is related to one or more roles. The user obtains permissions of the related role. When or after the role is created, a department is selected for the role, so that the role belongs to the department. The role is authorized according to its work content, the name of the role is unique in the department, and the number of the role is unique in the system.

Definition of a role: a role does not have the nature of a group/class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/class/a post/a position/a type of work in nature, and one role can correspond to multiple users. However, in the present application, the concept of "role" is equivalent to a post number/a work station number, and is also similar to the role in a film and television drama: one role (in childhood, juvenile, middle-age . . . ) can be played by only one actor or actress during the same period, but one actor or actress may play multiple roles.

When a user is transferred from a post, the user's relation to the original role is canceled, and the user is related to a new role. The user loses the permissions of the original role and obtains the permissions of the new role automatically.

When an employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After a role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) permissions through the role related to the corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

S12. one or more grantees are configured for each authorization operator.

The grantee includes a role, a user, an employee, a group and a class, or one or more types thereof, wherein the role is an individual, rather than the group/class, one role can only be related to a unique user, while one user can be related to one or more roles in the same period; and the user acquires the permission of the role associated therewith.

When the grantees are configured for the authorization operator, and if the grantees are selected as a department, all roles/users/employees/groups/classes/templates under said department are grantees corresponding to said authorization operator, and roles/users/employees/groups/classes added subsequently under said department are also grantees corresponding to said authorization operator, thereby achieving the quick selection of a large number of roles/users/employees/groups/classes and improving the authorization efficiency.

The grantee corresponding to each authorization operator does not include said authorization operator.

S13. each authorization operator configures a permission respectively for each grantee requiring permission configuration among all the grantees corresponding to said authorization operator.

Further, each authorization operator configures a permission respectively for each grantee requiring permission configuration among all the grantees corresponding to said authorization operator, i.e., each authorization operator grants the corresponding permission respectively to each grantee requiring permission configuration among all the grantees corresponding to said authorization operator.

Further, the permission configuration of an authorization operator for the grantees includes the configuration of one or more permissions of operations on sheets, fields of sheets, data corresponding to time-based field, data corresponding to field values of sheets, menus, statistics lists, column names of the statistics lists, data corresponding to time-based columns, data corresponding to column values of the statistics lists and the like of the authorization operator for the grantees.

Further, the permission configuration of the authorization operator for the grantees includes the configuration of attendance rules (e.g., attendance time, attendance locations and attendance ways) of the authorization operator for the grantees.

Further, the permission configuration of the authorization operator for the grantees includes the shift scheduling (e.g., configuring when the grantees are on-duty/off-duty, commuter time and the like) of the authorization operator for the grantees.

Further, the permission configuration of the authorization operator for the grantees includes the task assignment (e.g., assigning production tasks, after-sales tasks, sales order handling tasks and the like for the grantees) of the authorization operator for the grantees.

S14. The grantees execute corresponding operations according to the permission configured for the grantee.

For example, a sales manager 1, a salesman 1, a salesman 2 and other roles are configured under a Sales Department in the system. The system operator selects the sales manager 1 as the authorization operator, and selects the salesman 1 and the salesman 2 as the grantees for the sales manager 1; and the sales manager 1 configures a permission of viewing/modifying customers in household appliance industry for the salesman 1 and configures a permission of viewing/modifying customers in chemical engineering industry for the salesman 2, making the salesman 1 view/modify the customers in the household appliance industry according to the configured permission, and the salesman 2 view/modify the customers in the chemical engineering industry according to the configured permission.

The method for authorizing authorization operator in system further comprising that: authorization operation information of authorization operator is recorded, including one or more of the authorization operators, the grantees, authorized permissions, authorization time and the like.

Figure 6:
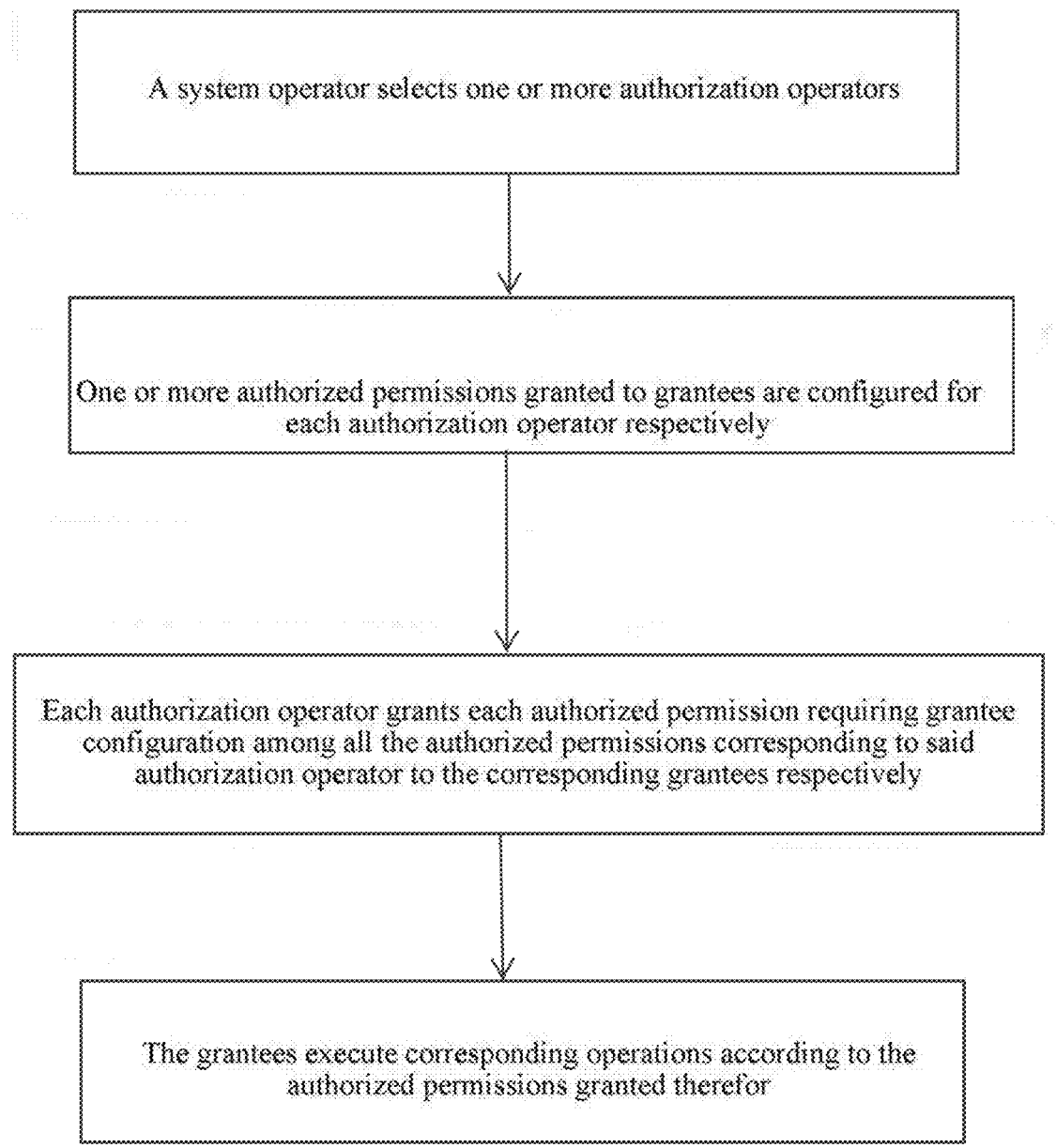
FIG. 6 is a flow schematic diagram of another implementation of the present invention.

[Embodiment II] As shown in FIG. 6, a method for authorizing authorization operator in system comprises that:

S21. a system operator selects one or more authorization operators.

The authorization operator includes a role, a user, an employee, a group and a class, or one or more types thereof.

The role is an independent individual not a group/class, and during the same period, one role can only be related to a unique user, while one user is related to one or more roles. When or after the role is created, the department is selected for the role, and therefore the role belongs to the department. The role is authorized according to the work content of the role, the name of the role is unique under the department, and the number of the role is unique in the system.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After a role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) permissions through the role related to the corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

S22. one or more authorized permissions granted to grantees are configured for each authorization operator respectively.

S23. each authorization operator grants each authorized permission requiring grantee configuration among all the authorized permissions corresponding to said authorization operator to the corresponding grantees respectively.

Further, each authorization operator grants each authorized permission requiring grantee configuration among all the authorized permissions corresponding to said authorization operator to the corresponding grantees respectively, i.e., each authorization operator grants one or more authorized permissions requiring grantee configuration among all the authorized permissions corresponding to said authorization operator to the corresponding grantees respectively.

The grantee includes a role, a user, an employee, a group and a class, or one or more types thereof, wherein the role is an individual, rather than the group/class, one role can only be related to a unique user, while one user can be related to one or more roles in the same period; and the user acquires the permission of the role associated therewith.

When the authorized permissions are granted to the grantees, and if the grantees are selected as a department, all roles/users/employees/groups/classes under said department are grantees corresponding to (selected by) said authorization operator, and roles/users/employees/groups/classes added subsequently under said department are also grantees corresponding to (selected by) said authorization operator, thereby achieving the quick selection/authorization of a large number of roles/users/employees/groups/classes and improving the authorization efficiency.

The grantee corresponding to each authorization operator does not include said authorization operator.

S24. The grantees execute corresponding operations according to the authorized permissions granted therefor.

For example, a sales manager 1, a salesman 1, a salesman 2, a salesman 3 and other roles are configured under a sales department in the system. The system operator selects the sales manager 1 as the authorization operator, and configures a permission of viewing/modifying customers in household appliance industry and a permission of viewing/modifying customers in chemical engineering industry as authorized permissions for the sales manager 1; and the sales manager 1 grants the permission of viewing/modifying customers in the household appliance industry to the salesman 1 and the salesman 2 and grants the permission of viewing/modifying customers in the chemical engineering industry to the sales manager 3, making the salesman 1 and the salesman 2 view/modify the customers in the household appliance industry according to the authorized permission that is granted, and the salesman 3 view/modify the customers in the chemical engineering industry according to the authorized permission that is granted.

For example, all operation permissions related to finance in the system are authorized to a deputy general manager in charge of finance, and the deputy general manager makes authorization according to the job demands of the employees/the roles in a Financial Department; and all operation permissions related to after-sales in the system are authorized to a deputy general manager in charge of after-sales, and the deputy general manager makes authorization according to the job demands of the employees/the roles in an After-Sales Department.

The method for authorizing authorization operator in system further includes that: authorization operation information of the authorization operator is recorded, including one or more of the authorization operators, the grantees, authorized permissions, authorization time and the like.

Figure 7:
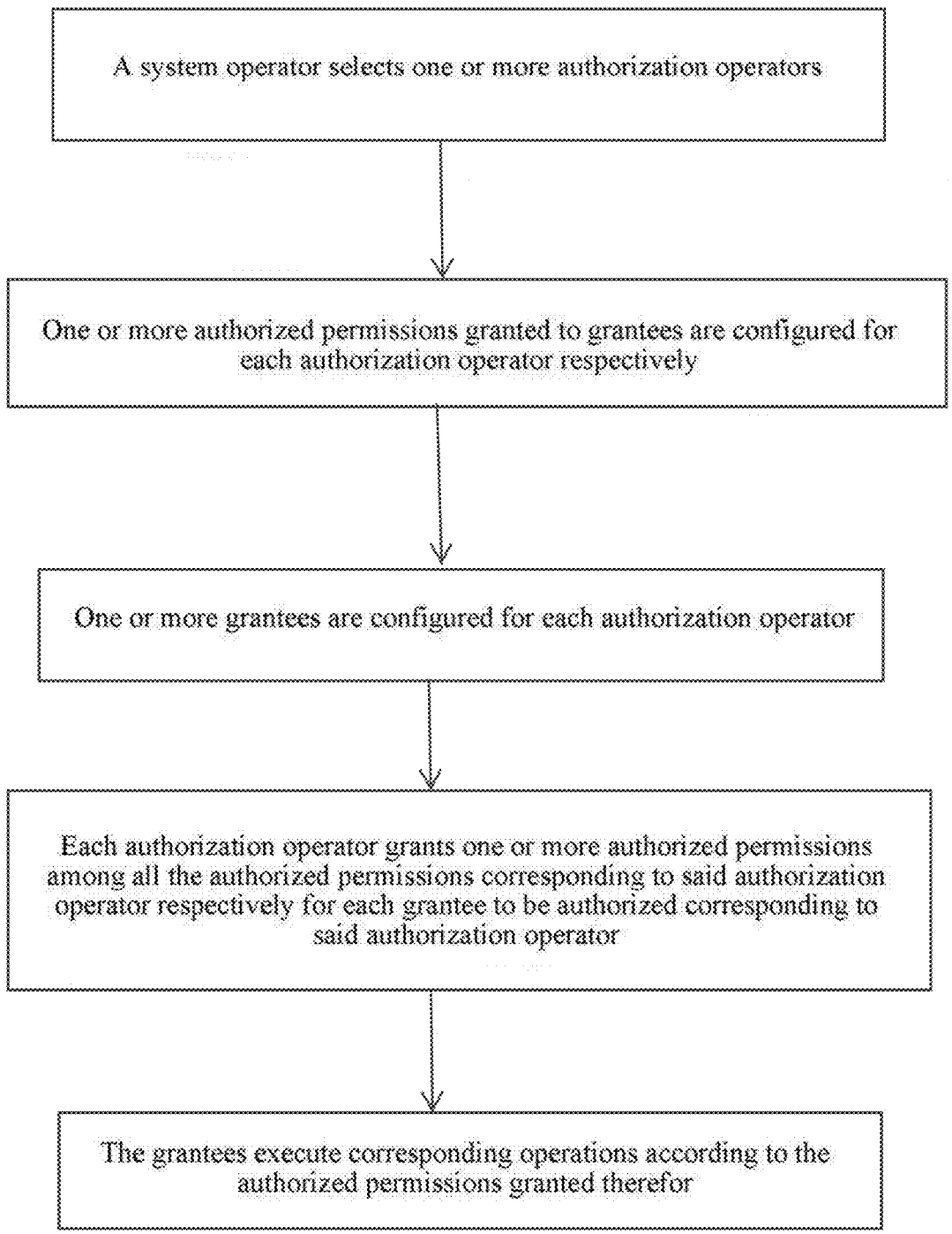
FIG. 7 is a flow schematic diagram of another implementation of the present invention.

[Embodiment III] As shown in FIG. 7, a method for authorizing authorization operator in system comprises that:

S31. a system operator selects one or more authorization operators.

The authorization operator includes a role, a user, an employee, a group and a class, or one or more types thereof.

The role is an independent individual not a group/class, and during the same period, one role can only be related to a unique user, while one user is related to one or more roles. When or after the role is created, the department is selected for the role, and therefore the role belongs to the department. The role is authorized according to the work content of the role, the name of the role is unique under the department, and the number of the role is unique in the system.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) permission through the role related to the corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

S32. One or more authorized permissions granted to grantees are configured for each authorization operator respectively.

S33. One or more grantees are configured for each authorization operator.

The grantee includes a role, a user, an employee, a group and a class, one or more types thereof, wherein the role is an individual, rather than the group/class, one role can only be related to a unique user, while one user can be related to one or more roles in the same period; and the user acquires the permission of the role associated therewith.

When the grantees are configured for the authorization operator, and if the grantees are configured as a department, all roles, users and employees under said department are grantees, thereby achieving the quick selection of a large number of roles, users and employees and improving the authorization efficiency.

When the grantees are configured for the authorization operator, and if the grantees are selected as a department, all roles/users/employees/groups/classes under said department are grantees corresponding to said authorization operator, and roles/users/employees/groups/classes added subsequently under said department are also grantees corresponding to said authorization operator, thereby achieving the quick selection of a large number of roles/users/employees/groups/classes and improving the authorization efficiency.

The grantee corresponding to each authorization operator does not include said authorization operator.

S34. Each authorization operator grants one or more authorized permissions among all the authorized permissions corresponding to said authorization operator respectively for each grantee to be authorized corresponding to said authorization operator.

Further, each authorization operator grants one or more authorized permissions among all the authorized permissions corresponding to said authorization operator to each grantee to be authorized corresponding to said authorization operator respectively, i.e., each authorization operator grants each authorized permission requiring grantee configuration among all the authorized permissions corresponding to the authorization operator to one or more grantees among all the grantees corresponding to said authorization operator.

When the authorized permissions are granted to the grantees, and if the grantees are selected as a department, all roles/users/employees/groups/classes under said department are grantees corresponding to (selected by) said authorization operator, and roles/users/employees/groups/classes added subsequently under said department are also grantees corresponding to (selected by) said authorization operator, thereby achieving the quick selection/authorization of a large number of roles/users/employees/groups/classes and improving the authorization efficiency.

S35. The grantees execute corresponding operations according to the authorized permissions granted therefor.

For example, a sales manager 1, a salesman 1, a salesman 2, a salesman 3, a salesman 4 and other roles are configured under a Sales Department in the system. The system operator selects the sales manager 1 as the authorization operator, selects the salesman 1, the salesman 2, the salesman 3 and the salesman 4 as the grantees for the sales manager 1 and configures a permission of viewing/modifying customers in household appliance industry, a permission of viewing/modifying customers in chemical engineering industry and a permission of viewing/modifying customers in software industry as authorized permissions for the sales manager 1; and the sales manager 1 grants the permission of viewing/modifying customers in the household appliance industry to the salesman 1 and grants the permission of viewing/modifying customers in the software industry to the sales manager 3 and the salesman 4, making the salesman 1 view/modify the customers in the household appliance industry according to the authorized permission that is granted, and the salesman 3 and the salesman 4 view/modify the customers in the software industry according to the authorized permission that is granted.

The method for authorizing authorization operator in system further comprising that: authorization operation information of the authorization operator is recorded, including one or more of the authorization operator, the grantees, authorized permissions, authorization time and the like.

The above is only a preferred embodiment of the present invention. It should be understood that the present invention is not limited to the forms disclosed herein, and is not to be construed as the exclusion to the other embodiments, but may be used in various other combinations, modifications and environments. Modifications can be made according to the techniques or knowledge of the above teachings or related art within the scope of the teachings herein. All changes and modifications made by those skilled in the art are intended to be within the scope of the appended claims.

What is claimed is:

1. A method for granting an operation permission via an authorization operator in a system, comprising:

selecting one or more authorization operators;

configuring one or more grantees for each of the selected one or more authorization operators;

granting, by at least one of the selected one or more authorization operators, one or more operation permissions for at least one grantee requiring operation permission corresponding to the at least one of the selected one or more authorization operators; and executing, by the at least one grantee, a corresponding operation according to one of the granted one or more operation permissions;

wherein the at least one grantee comprises a role and the system comprises one or more roles, wherein each role of the one or more roles is independent which is not a group or class, and during a same period, in a case one role of the one or more roles is related to a user, said one role is configured to be related to the user only, and the user is configured to be related to said one role or more roles; and the user is configured to obtain one or more operation permissions of the related said one role or more roles;

wherein when or after a role is created, a department is selected for the role, wherein the role belongs to the department; the role is authorized according to the work content of the role, a name of the role is unique under the department, and a number of the role is unique in the system; and when said user is transferred, the user's relation to an original role is canceled, and the user is configured to be related to a new role.

2. The method according to the claim 1, further comprises: recording the grant information of the operation permission of the selected one or more authorization operators.

3. The method according to the claim 1, wherein the one or more grantees corresponding to one selected authorization operator do not comprise the one selected authorization operator.

4. The method according to the claim 1, wherein when one or more grantees are configured for one authorization operator, if one department is selected as one grantee, all roles under the said one department are configured to be the grantees corresponding to the one authorization operator, and any role or roles added subsequently under the said one department are configured to be the grantees corresponding to the one authorization operator.

5. A method for granting an operation permission via an authorization operator in a system, comprising:

selecting one or more authorization operators;

configuring one or more operation permissions to be granted to one or more grantees for each of the selected authorization operator respectively;

granting, by at least one of the selected one or more authorization operators to at least one grantee of the one or more grantees, one or more operation permissions requiring grantee configuration; and executing, by the at least one grantee, a corresponding operation according to one of the granted one or more operation permissions;

wherein the at least one grantee comprises a role and the system comprises one or more roles, wherein each role of the one or more roles is independent which is not a group or class, and during a same period, in a case one role of the one or more roles is related to a user, said one role is configured to be related to the user only, and the user is configured to be related to said one role or more roles; and the user is configured to obtain one or more operation permissions of the related said one role or more roles;

wherein when or after a role is created, a department is selected for the role, wherein the role belongs to the department; the role is authorized according to the work content of the role, a name of the role is unique under the department, and a number of the role is unique in the system; and when said user is transferred, the user's relation to an original role is canceled, and the user is configured to be related to a new role.

6. A method for granting an operation permission via an authorization operator in a system, comprising:

selecting one or more authorization operators;

configuring one or more operation permissions to be granted to one or more grantees for each of the selected one or more authorization operators respectively;

configuring one or more grantees for each of the one or more selected authorization operators respectively;

granting, by at least one of the selected one or more authorization operators, one or more operation permissions corresponding to the at least one of the selected one or more authorization operators to at least one grantee corresponding to the at least one of the selected one or more authorization operators; and executing, by the at least one grantee, a corresponding operation according to one of the granted one or more operation permissions;

wherein said at least one grantee comprises a role and the system comprises one or more roles, wherein each role of the one or more roles is independent which is not a group or class, and during a same period, in a case one role of the one or more roles is related to a user, said one role is configured to be related to the user only, and the user is configured to be related to said one role or more roles; and the user is configured to obtain one or more operation permissions of the related said one role or more roles;

wherein when or after a role is created, a department is selected for the role, wherein the role belongs to the department; the role is authorized according to the work content of the role, a name of the role is unique under the department, and a number of the role is unique in the system; and when said user is transferred, the user's relation to an original role is canceled, and the user is configured to be related to a new role.

* * * * *